(12) United States Patent
Kuraya et al.

(10) Patent No.: US 8,167,529 B2
(45) Date of Patent: May 1, 2012

(54) WORK VEHICLE

(75) Inventors: Yoshiaki Kuraya, Osaka (JP); Katsumi Fujiki, Osaka (JP); Tetsuya Iida, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 225 days.

(21) Appl. No.: 12/561,672

(22) Filed: Sep. 17, 2009

(65) Prior Publication Data

US 2011/0064552 A1 Mar. 17, 2011

(51) Int. Cl.
*E02F 3/627* (2006.01)
(52) U.S. Cl. ......................... 414/686; 172/272
(58) Field of Classification Search .................. 414/686; 172/272
See application file for complete search history.

(56) References Cited

U.S. PATENT DOCUMENTS

| | | | |
|---|---|---|---|
| 3,586,195 A | 6/1971 | Beltrami | |
| 5,232,330 A | 8/1993 | Rae | |
| 5,536,134 A * | 7/1996 | Hirooka | 414/686 |
| 5,620,297 A | 4/1997 | Mahaney | |
| 5,895,199 A * | 4/1999 | Baumert et al. | 414/686 |
| 2004/0228715 A1 | 11/2004 | Roan et al. | |

FOREIGN PATENT DOCUMENTS

| | | |
|---|---|---|
| FR | 2.209.015 | 6/1974 |
| GB | 947803 | 1/1964 |
| JP | 2007-262826 | 10/2007 |

* cited by examiner

*Primary Examiner* — Donald Underwood
(74) *Attorney, Agent, or Firm* — Sterne, Kessler, Goldstein & Fox P.L.L.C.

(57) ABSTRACT

A tractor includes a mounting plate, a protruding tube, a boom supporter, and a boom. The mounting plate is attachable to a frame on a side surface of a vehicle. The protruding tube is connected to the mounting plate, and shaped to protrude from a portion in which the protruding tube is connected to the mounting plate, toward the outside of the vehicle. The boom supporter is connected to a distal end portion of the protruding tube, and shaped to protrude upward from a portion in which the boom supporter is connected to the distal end portion of the protruding tube. The boom is coupled to the boom supporter via a boom coupler, and formed to extend from the boom coupler toward the front side of the vehicle. In a side view, an imaginary straight line extending vertically downward from the boom coupler is located rearward of the protruding tube.

6 Claims, 11 Drawing Sheets

WORK VEHICLE

BACKGROUND OF THE INVENTION

1. Field of the Invention

The present invention relates to a work vehicle such as a tractor. Specifically, the present invention relates to a work vehicle having a loader provided at the front thereof.

2. Description of the Background Art

For a loader mounted to a tractor for the purpose of cargo handling or the like, there is known a configuration for transportation, in which, by using a cylinder and a link mechanism, a pair of left and right booms are moved up and down and a bucket or the like disposed at the distal ends of the booms is rotated (see Japanese Laid-Open Patent Publication No. 2007-262826).

However, in the work vehicle as mentioned above, the center of gravity of the vehicle is deviated frontward because of the loader provided at the front of the vehicle, and therefore the load acting on front wheels is greater than the load acting on rear wheels, which may worsen a load balance in the vehicle.

SUMMARY OF THE INVENTION

The present invention has been accomplished in view of the above circumstances, and an object of the present invention is to improve a load balance in a work vehicle having a loader.

MEANS FOR SOLVING THE PROBLEMS AND EFFECTS

Problems to be solved by the present invention are as described above. Next, means for solving the problems and effects thereof will be described.

According to an aspect of the present invention, a work vehicle configured as follows is provided. That is, the work vehicle includes a mounting plate, a protruding member, a boom supporter, and a boom. The mounting plate is attachable to a frame that is on a side surface of a vehicle body. The protruding member is connected to the mounting plate, and shaped so as to protrude from a portion in which the protruding member is connected to the mounting plate, toward the outside of the vehicle body. The boom supporter is connected to a distal end portion of the protruding member, and shaped so as to protrude upward from a portion in which the boom supporter is connected to the distal end portion of the protruding member. The boom is coupled to the boom supporter via a coupling part, and formed so as to extend from the coupling part toward the front side of the vehicle body. In a side view, an imaginary straight line extending vertically downward from the coupling part is located rearward of the protruding member.

That is, when the length of the boom is increased, the workability is improved, but the center of gravity of the vehicle is deviated frontward and therefore the load acting on front wheels is greater than the load acting on rear wheels, which worsens a load balance in the work vehicle. Moreover, when the length of the boom is increased, the length of the vehicle is also increased, which requires a storage space to be enlarged. In this respect, in the above-described configuration, since a proximal end portion of the boom can be positioned rearward, a load balance is better than a load balance in a work vehicle having a boom of similar length, and thus a work vehicle that can be stored in a small space can be provided.

In the above-described work vehicle, the following configuration is preferred. That is, the boom supporter includes a lower boom-coupling member positioned at a lower side and an upper boom-coupling member positioned at an upper side. In a side view, the lower boom-coupling member protrudes upward and rearward from the portion in which the lower boom-coupling member is connected to the protruding member. In a side view, the upper boom-coupling member protrudes upward from a portion in which the upper boom-coupling member is connected to the lower boom-coupling member.

Consequently, the boom supporter is positioned rearward of the protruding member, and therefore the proximal end portion of the boom can be positioned rearward. Accordingly, the effect such as the improved load balance described above can be exerted by a simple configuration.

In the above-described work vehicle, it is preferred that a reinforcing member, which is connected to the mounting plate and the lower boom-coupling member to thereby provide reinforcement, is provided rearward of the protruding member.

Consequently, the lower boom-coupling member is supported by the protruding member and the reinforcing member, which enables the boom to be supported with an increased stability.

In the above-described work vehicle, it is preferred that the reinforcing member is connected to the lower boom-coupling member, near the portion in which the lower boom-coupling member and the upper boom-coupling member are connected to each other.

Consequently, the portion in which the lower boom-coupling member and the upper boom-coupling member are connected to each other can be reinforced by the reinforcing member. In addition, although the load of the boom acts on the coupling part, the portion in which the lower boom-coupling member and the upper boom-coupling member are connected to each other is located below the coupling part, and therefore the boom can be efficiently supported by a reinforcing plate.

In the above-described work vehicle, the following configuration is preferred. That is, the work vehicle includes a floor on which an operator can put his/her feet. Also, the work vehicle includes a floor extension member that is connected to a front portion of the floor and provided in an interior space formed above the reinforcing member and inside the boom supporter.

This enables effective utilization of a space between the vehicle and the boom supporter. In addition, since the reinforcing member is disposed below the floor extension member, the reinforcing member does not become an obstacle when the operator stretches his/her leg to the floor extension member.

In the above-described work vehicle, the following configuration is preferred. That is, the work vehicle includes a hydraulic pipe that supplies hydraulic oil to a hydraulic unit. The hydraulic pipe passes through the interior space.

Consequently, the hydraulic pipe is positioned above the reinforcing member, and therefore the reinforcing member can prevent the hydraulic pipe from hanging down. Thus, a special configuration for supporting the hydraulic pipe is not required, and a simple configuration can be realized.

In the above-described work vehicle, it is preferred that the hydraulic pipe is disposed below the floor extension member.

Consequently, the hydraulic pipe can be disposed in a reasonable manner, by effective utilization of the interior space.

In the above-described work vehicle, the following configuration is preferred. That is, the work vehicle includes a hydraulic coupling disposed below the floor. The hydraulic pipe passes below the floor extension member and above the reinforcing member, and is connected to the hydraulic coupling.

Consequently, the hydraulic pipe and the hydraulic coupling can be disposed in a reasonable manner, by effective utilization of the interior space and a rearward space thereof.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 2:
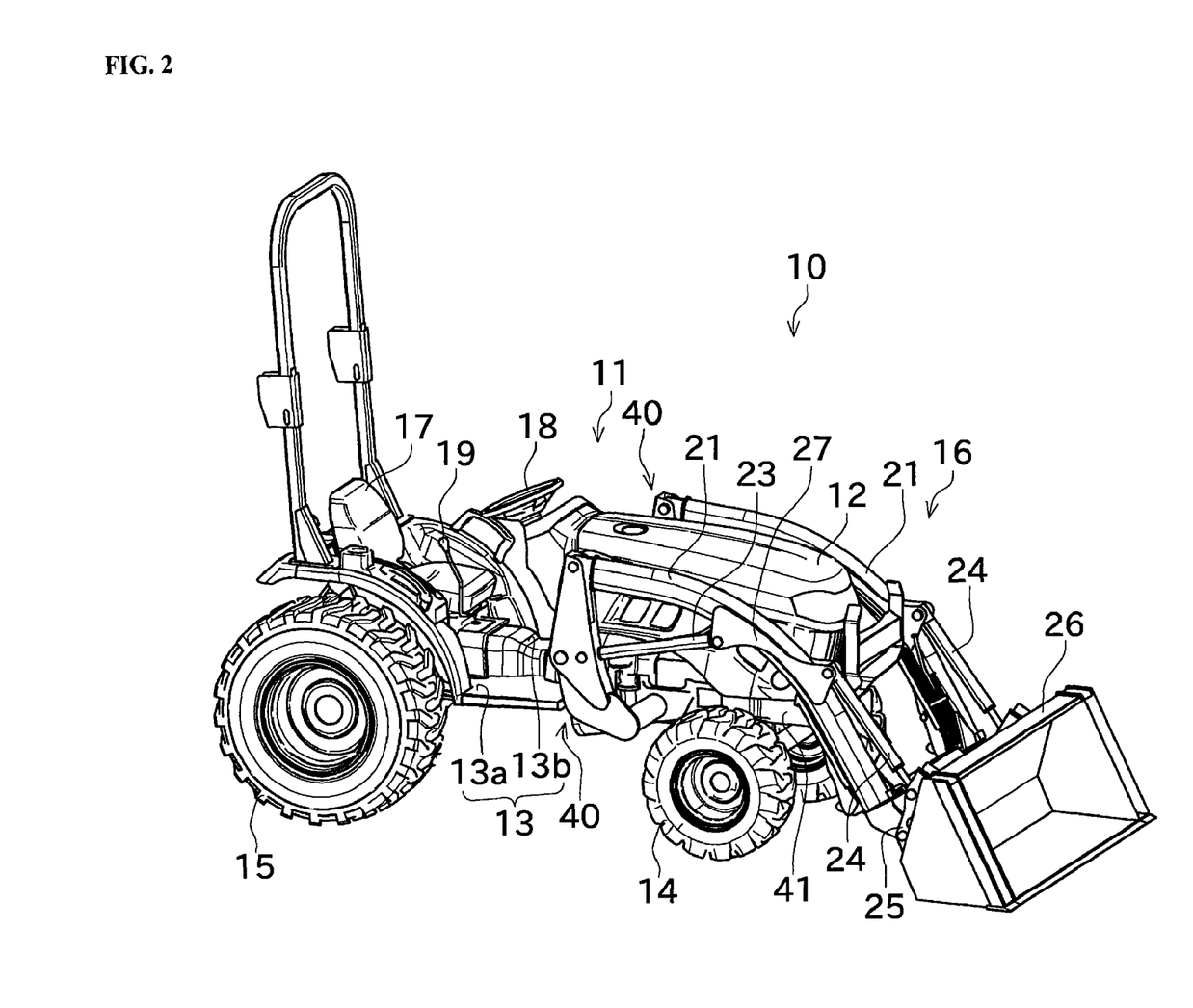
FIG. 2 is a perspective view showing an entire structure of a tractor according to an embodiment of the present invention.

Hereinafter, a preferred embodiment of the present invention will be described with reference to the drawings. FIG. 2 is a perspective view showing an entire structure of a tractor 10 according to an embodiment of the present invention. In the present specification, simply by the phrases of "left side", "right side", and the like, the left side and the right side with respect to a direction in which a tractor moves forward are referred to.

The tractor (work vehicle) 10 shown in FIG. 2 includes, as a main structure, a main body 11, front wheels 14, rear wheels 15, boom support mechanisms 40, a front loader 16, an operator's seat 17, and a floor 13.

A hood 12 is provided at a front portion of the main body 11, and an oil supply tank, an engine, and the like, which are not shown, are disposed inside the hood 12. A frame 41 is provided at a lower portion of the tractor 10, and supports the engine. Power outputted by the engine is, via a transmission mechanism which is not shown, transmitted to the front wheels 14 and the rear wheels 15. The front wheels 14 and the rear wheels 15 are rotated by the power of the engine being transmitted thereto, so that the tractor 10 can be moved.

The boom support mechanism 40, for supporting the front loader 16, is mounted at each of the left and right sides of the tractor 10. A detailed configuration of the boom support mechanism 40 will be described later.

The front loader 16 is detachable from the tractor 10. The front loader 16 includes: a pair of booms 21 disposed on both the left and right sides of the main body 11; lift cylinders 23 for moving the booms 21 up and down; and dump cylinders 24 for rotating a bucket 26. The proximal end (the end at the rear side of the vehicle) of the boom 21 is supported by the boom support mechanism 40, and a hitch 25 is attached to the distal end (the end at the front side of the vehicle) of the boom 21.

The boom 21 extends toward the front of the tractor 10 while curving in an arc along a curvature of the hood 12. The proximal end side of the boom 21 is rotatably coupled to an upper portion of the boom support mechanism 40, and the distal end side of the boom 21 is rotatably coupled to the hitch 25. The boom 21 is formed as a pipe member having an oval-like or elliptical cross-sectional shape. This realizes a good appearance while ensuring strength equal to or higher than the strength of a boom that is formed as a rectangular pipe.

A cylinder-bearing plate 27 is disposed at a substantially central portion of the boom 21 with respect to the longitudinal direction thereof. The lift cylinder 23 is coupled to the end, at the proximal end side, of the cylinder-bearing plate 27, and the dump cylinder 24 is coupled to the end, at the distal end side, of the cylinder-bearing plate 27. The lift cylinder 23 and the dump cylinder 24 are driven in an extendable and retractable manner, by hydraulic oil being supplied to a port which is not shown.

In this configuration, when the lift cylinder 23 is extended, the boom 21 is rotated upward and the bucket 26 is raised. On the other hand, when the lift cylinder 23 is retracted, the boom 21 is rotated downward and the bucket 26 is lowered. In addition, when the dump cylinder 24 is retracted, the bucket 26 is rotated upward (scooping operation). On the other hand, when the dump cylinder 24 is extended, the bucket 26 is rotated downward (dumping operation).

The hitch 25 is coupled to the boom 21, the dump cylinder 24, and the bucket 26. An attachment such as the bucket 26 can be detachably attached to the hitch 25. A structure for attachment and detachment of the bucket 26 to/from the hitch 25 will be described in detail later.

The operator's seat 17, on which an operator sits to perform various operations, is provided at a rear portion of the main body 11. The operator operates a steering wheel 18, a lever 19, a pedal which is not shown, and the like, which are placed near the operator's seat 17, and thereby can change the direction in which the tractor 10 travels, and extend and retract the lift cylinders 23 and the dump cylinders 24. A transmission mechanism, which is not shown, for changing the speed of rotation of the engine is disposed below the operator's seat 17.

The floor 13, on which the operator sitting on the operator's seat 17 can put his/her feet, is disposed in front of and below the operator's seat 17. The floor 13 includes a pair of left and right floor flat portions 13a, each of which is formed in the shape of a substantially horizontal plate, and a floor projecting portion 13b which connects the two floor flat portions 13a to each other. The floor projecting portion 13b is shaped so as to curve upward. A drive shaft for transmitting power from the engine to the transmission mechanism, and the like, are disposed under a raised portion of the floor projecting portion 13b. The floor flat portion 13a is also used as a step on which the operator puts his/her feet when climbing up onto the operator's seat 17.

Figure 3:
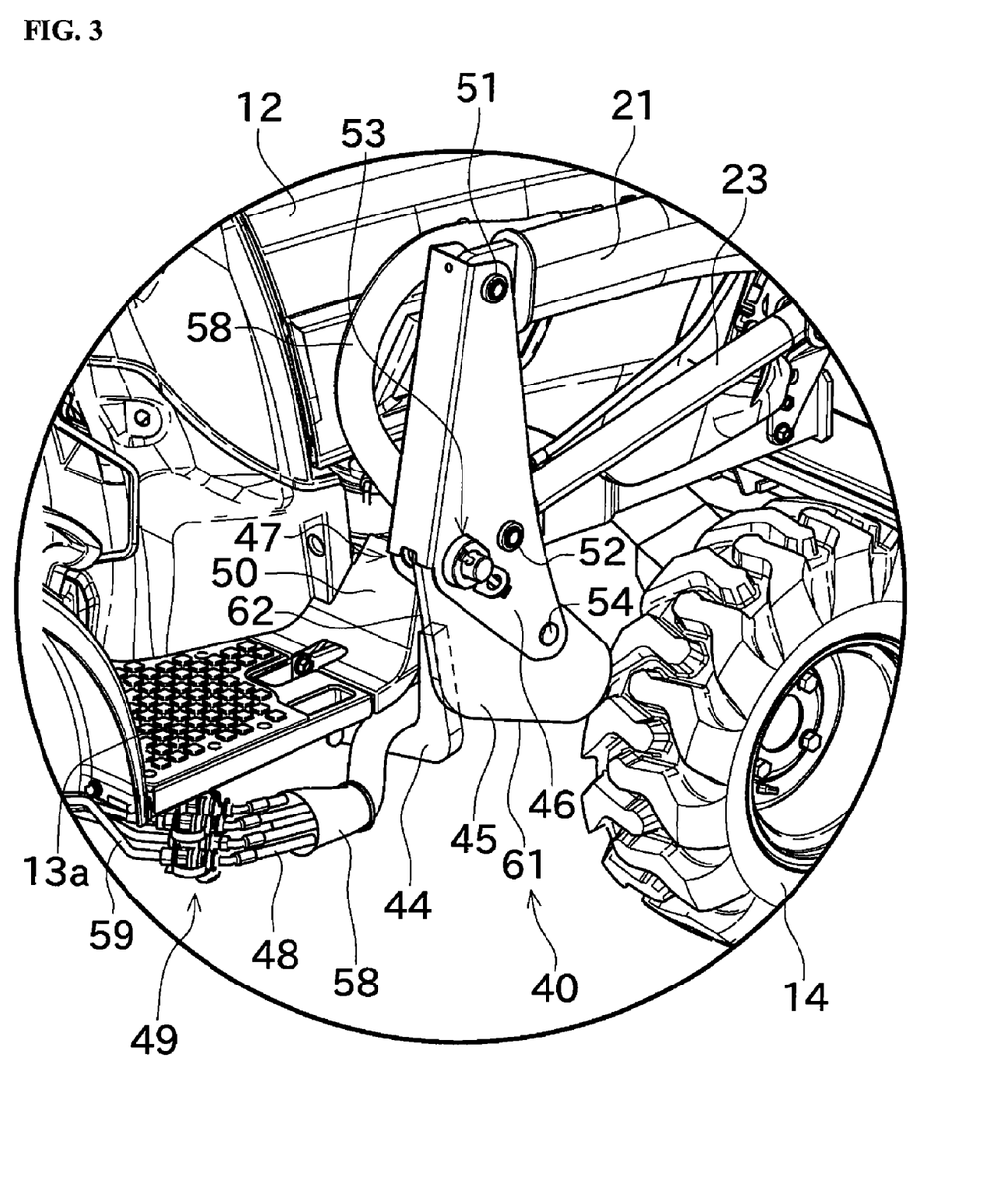
FIG. 3 is a perspective view showing the boom support mechanism as seen obliquely from above.
Figure 4:
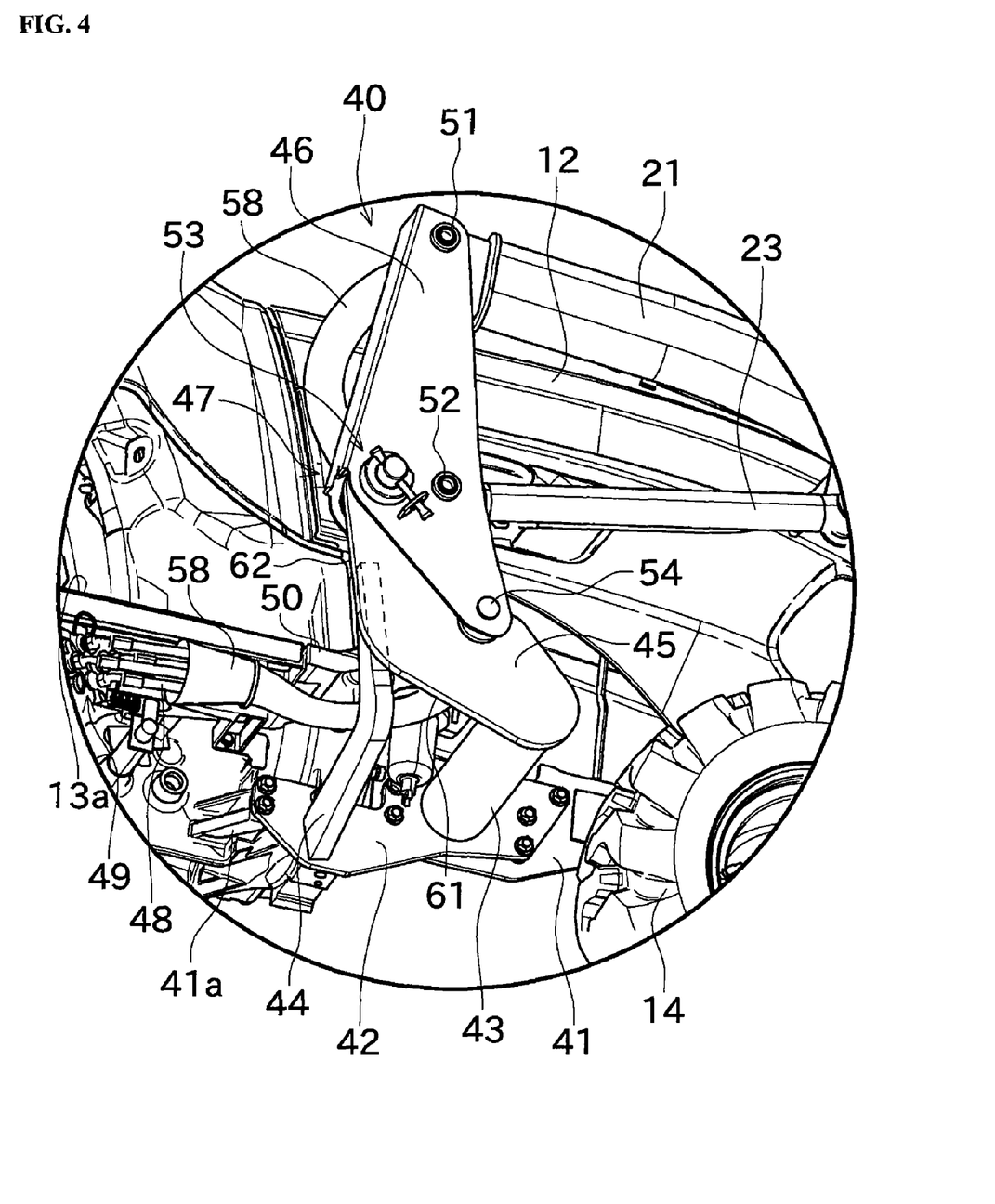
FIG. 4 is a perspective view showing the boom support mechanism as seen obliquely from below.
Figure 5:
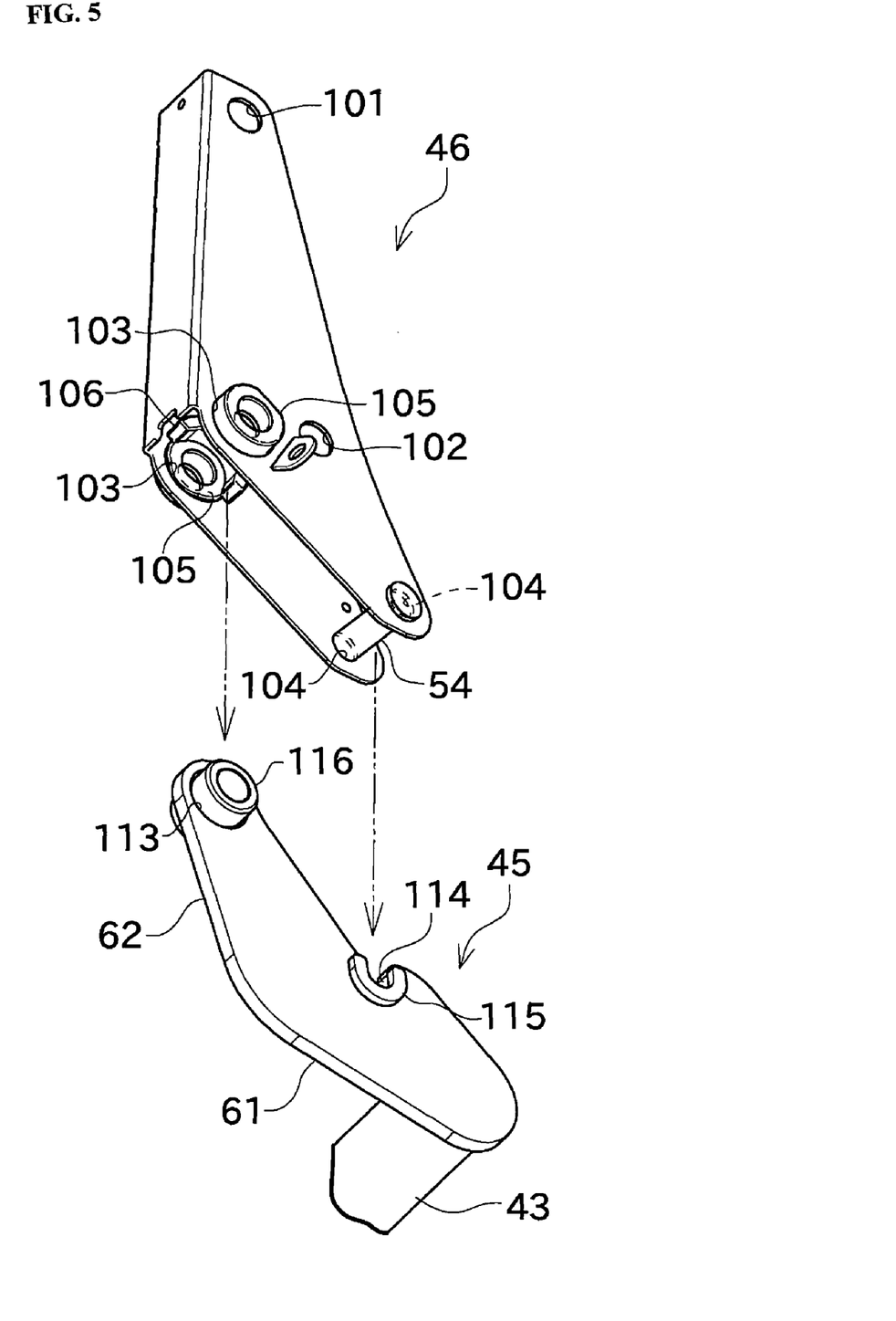
FIG. 5 is a perspective view illustrating a positional relationship between a lower boom-coupling member and an upper boom-coupling member.

Next, with reference to FIGS. 3 to 5, the boom support mechanism 40 of the present embodiment will be described in detail. FIG. 3 is a perspective view showing the boom support mechanism 40 as seen obliquely from above. FIG. 4 is a perspective view showing the boom support mechanism 40 as seen obliquely from below. FIG. 5 is a perspective view illustrating a positional relationship between a lower boom-coupling member 45 and an upper boom-coupling member 46.

The boom support mechanisms 40 are disposed at the left and right sides of the tractor 10, and support proximal end portions of the pair of booms 21, respectively. The left and right boom support mechanisms 40 are symmetrical to each other, and therefore, in the following, only the right boom support mechanism 40 will be described as a representative.

As shown in FIG. 4, the boom support mechanism 40 includes a mounting plate 42, a protruding tube (protruding member) 43, a reinforcing rib (reinforcing member) 44, and a boom supporter 47. The boom supporter 47 is formed with the lower boom-coupling member 45 and the upper boom-coupling member 46 being connected to each other.

The mounting plate 42 is a plate-like member having a constant thickness, and fixed by bolts (fixing member) so as to extend over a frame 41 and a clutch housing 41a of the tractor 10 (FIG. 4). Specifically, a front portion of the mounting plate 42 is attached to the frame 41 by the bolts, and a rear portion of the mounting plate 42 is attached to the clutch housing 41a by the bolts. This structure enables load received by the mounting plate 42 to be distributed between the frame 41 and the clutch housing 41a. Moreover, the protruding tube 43 is attached to a surface of the mounting plate 42 at one side thereof with respect to the thickness direction thereof.

The protruding tube 43 is a cylindrical member, and provided so as to protrude horizontally from the mounting plate 42 toward the outside of a vehicle body. The protruding tube 43 is formed in a linear shape, and has one longitudinal end thereof fixed to the mounting plate 42 and the other longitudinal end thereof fixed to the lower boom-coupling member 45. The protruding tube 43 is disposed in such a manner that, when the mounting plate 42 is attached to the tractor 10, the protruding tube 43 is located rearward of the front wheel 14. Instead of the protruding tube 43, a columnar (solid) member, a member having a polygonal cross section, or the like, may be used.

The reinforcing rib 44 is an L-shaped member and, in the same manner as the protruding tube 43, formed so as to connect the mounting plate 42 and the lower boom-coupling member 45 to each other. Specifically, the reinforcing rib 44 protrudes horizontally from the mounting plate 42 toward the outside of the vehicle body, then bends upward at a substantially right angle, and has the upper end thereof fixed to the lower boom-coupling member 45.

The lower boom-coupling member 45 is a triangular plate-like member, and is attached to an end portion of the protruding tube 43, as shown in FIG. 4. The lower boom-coupling member 45 is formed so as to extend upward and rearward from its portion to which the protruding tube 43 is attached, and the upper boom-coupling member 46 is attached to an upper portion of the lower boom-coupling member 45. As described above, the lower boom-coupling member 45 has a triangular shape, and the contour of the lower edge thereof includes a rear extending portion 61 and an upper extending portion 62. The rear extending portion 61 linearly extends, from the lower edge of the portion to which the protruding tube 43 is fixed, upward and rearward at a gentle (nearly horizontal) angle. The upper extending portion 62 linearly extends, from an end portion of the rear extending portion 61, upward and rearward at a steep angle. An upper end portion of the reinforcing rib 44 is fixed to the lower boom-coupling member 45, near a portion in which the rear extending portion 61 and the upper extending portion 62 are connected to each other.

The upper boom-coupling member 46 is a vertically elongated triangular member, and a lower portion thereof is coupled to the lower boom-coupling member 45. On an upper end portion of the upper boom-coupling member 46, the boom 21 is rotatably supported.

A configuration of the lower boom-coupling member 45 and the upper boom-coupling member 46 being connected to each other will be described with reference to FIG. 5. FIG. 5 is a perspective view illustrating a positional relationship between the lower boom-coupling member 45 and the upper boom-coupling member 46.

As shown in FIG. 5, a fixing hole 113 and a fixing recess 114, for fixing the upper boom-coupling member 46, are formed in the lower boom-coupling member 45. The fixing hole 113 is formed as a through hole, and the fixing recess 114 is open at its upper side. In the fixing hole 113, a tubular member 116 having an axial hole is fixed while being inserted therethrough. The tubular member 116 is formed in the shape of a short cylinder, and disposed such that the both ends thereof protrude from the fixing hole 113. In the vicinity of the fixing recess 114, a U-shaped spacer 115 is fixed to each side of the lower boom-coupling member 45.

The upper boom-coupling member 46 has two flat plates that are positioned in parallel at a predetermined interval, with one side of each of the flat plates being coupled to each other by a flat plate. The two flat plates have the same shape. In each of the flat plates, a boom mounting hole 101 for mounting the boom 21 and a cylinder mounting hole 102 for mounting the lift cylinder 23 are formed. Moreover, fixing holes 103 and 104 for fixing the lower boom-coupling member 45 are formed in the flat plate. In one fixing hole 103, a positioning member 105 for positioning the tubular member 116 is disposed. The positioning member 105 is formed in a tubular shape, and has an arc-shaped guide 106 which comes into contact with the tubular member 116 of the lower boom-coupling member 45, for the positioning thereof. In the other fixing hole 104, an insertion pin 54 is fixed. The insertion pin 54 is disposed so as to connect the two flat plates that form the upper boom-coupling member 46.

In the above-described configuration, for connecting the lower boom-coupling member 45 and the upper boom-coupling member 46 to each other, the upper boom-coupling member 46 is inserted in the direction shown in FIG. 5. Consequently, the positioning members 105 (guides 106) of the upper boom-coupling member 46 and the tubular member 116 of the lower boom-coupling member 45 come into contact with each other, and moreover the insertion pin 54 of the upper boom-coupling member 46 is inserted into the fixing recess 114 of the lower boom-coupling member 45. Then, in a state where an axial hole of the positioning members 105 and the axial hole of the tubular member 116 coincide with each other, a fixture 53 shown in FIGS. 3 and 4 is inserted into the axial holes, so that the lower boom-coupling member 45 and the upper boom-coupling member 46 can be coupled to each other.

As described above, coupling the upper boom-coupling member 46 and the lower boom-coupling member 45 to each other creates such a state that the lower boom-coupling member 45 is inserted into the upper boom-coupling member 46. The spacer 115 and the tubular member 116 shown in FIG. 5 have a function as a restriction member that prevents the upper boom-coupling member 46 from moving in the axial direction of the fixture 53 relative to the lower boom-coupling member 45.

The boom 21 is coupled, via a boom coupler (coupling part) 51, to the boom mounting holes 101 of the upper boom-coupling member 46, so that the boom 21 is rotatably supported. The boom coupler 51 is disposed frontward of the steering wheel 18 of the tractor 10 (see FIG. 1). In addition, the lift cylinder 23 is coupled, via a cylinder coupler 52, to the cylinder mounting holes 102 shown in FIG. 5, so that the lift cylinder 23 is rotatably mounted.

Next, a configuration around the above-described boom support mechanism 40 will be described. As shown in FIG. 3, a floor extension member 50, a plurality of hydraulic pipes 48, and a hydraulic coupling 49 are disposed around the boom support mechanism 40.

The floor extension member 50 is disposed on the front side of the floor 13 (floor flat portion 13a) and inside the lower boom-coupling member 45. The floor extension member 50 is connected to a front end portion of the floor flat portion 13a, and formed in the shape of a curved plate with its front end oriented obliquely upward. The floor extension member 50 functions as a footrest on which the operator can put his/her foot, and also has a function as a foot restriction member that prevents the operator from stretching his/her leg too much and thus touching the hydraulic pipes 48 (tube member 58) which will be described later, and the like.

The hydraulic pipes 48 are for supplying hydraulic oil to hydraulic units (specifically, the lift cylinders 23 and the dump cylinders 24) provided in the tractor 10, and formed of a flexible material so that the hydraulic pipes 48 can be appropriately deformed. One end side of the hydraulic pipes 48 is connected to the hydraulic coupling 49, and the other end side thereof extends frontward while passing under the floor 13 (at a position nearer the right side of the tractor 10). Then, while being covered by the tube member 58, the hydraulic pipes 48 pass above (inside) the L-shaped reinforcing rib 44, and extend upward through a space inside the lower boom-coupling member 45 and the upper boom-coupling member 46, so as to form an S-shaped curve. Subsequently, the hydraulic pipes 48 extend inside and along the boom 21, and are connected to the lift cylinder 23 and the dump cylinder 24.

The hydraulic coupling 49 is connected, via a hydraulic pressure extraction tube 59, to a hydraulic valve which is not shown and which is placed below the operator's seat 17. The hydraulic pressure extraction tube 59 is disposed so as to extend frontward from the hydraulic valve, and the hydraulic pipes 48 are connected to the hydraulic coupling 49 provided at the distal end of the hydraulic pressure extraction tube 59. The hydraulic valve is opened and closed in conjunction with an appropriate operation tool that is provided for an operation of the front loader 16, and thereby a supply of the hydraulic oil to the lift cylinders 23 and the dump cylinders 24 can be controlled. Since the hydraulic pipes 48 are detachable from the hydraulic coupling 49, the hydraulic pipes 48 can be removed from the hydraulic coupling 49 when the front loader 16 is not mounted on the tractor 10.

Figure 1:
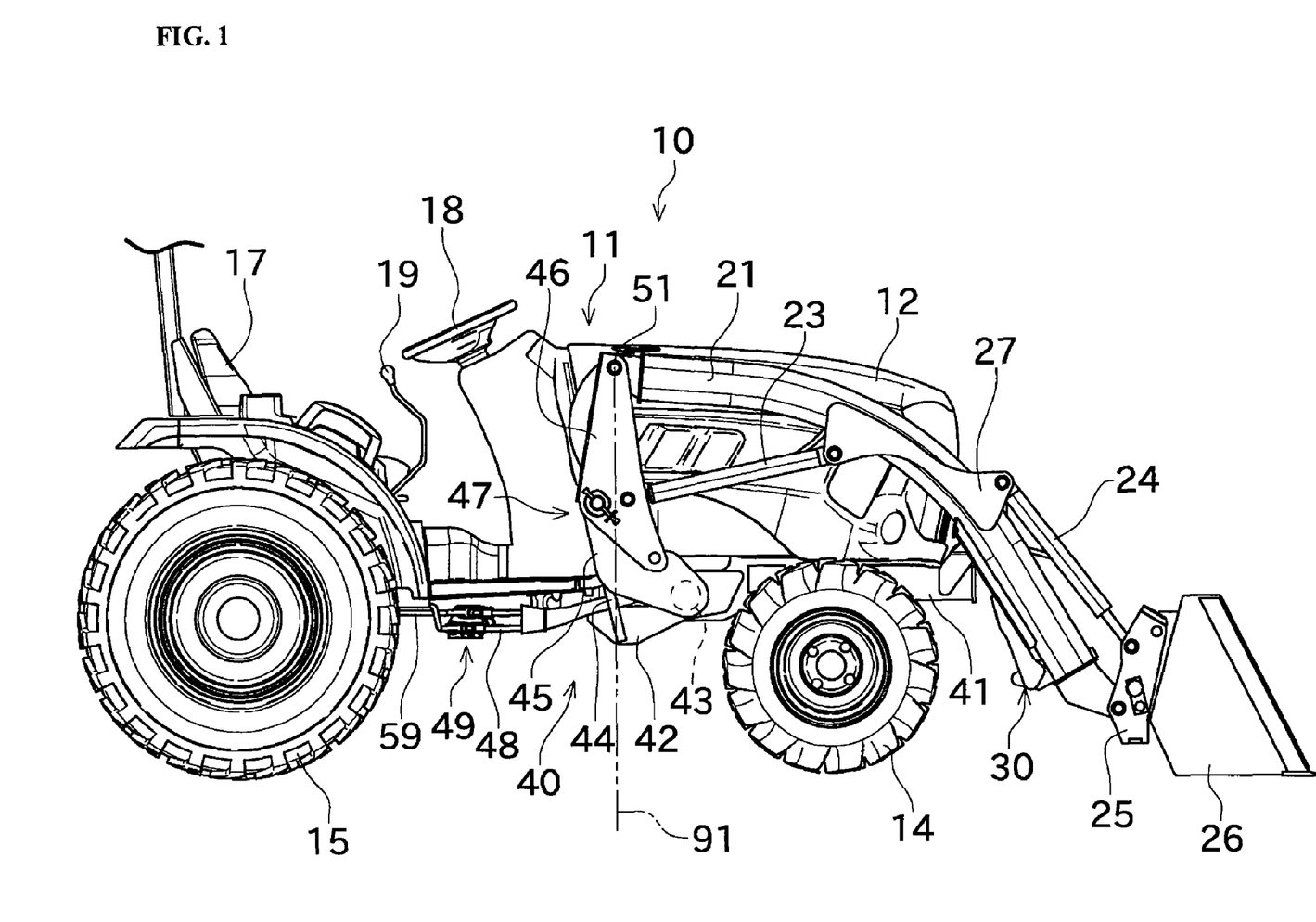
FIG. 1 is a side view showing a positional relationship among components of a boom support mechanism.

Next, a positional relationship among the components of the boom support mechanism 40 will be described with reference to FIG. 1. FIG. 1 is a side view showing a positional relationship among the components of the boom support mechanism 40.

In this side view, assuming an imaginary straight line 91 extending vertically downward from the boom coupler 51, a portion in which the protruding tube 43 is connected to the mounting plate 42 and the lower boom-coupling member 45 is located frontward of the imaginary straight line 91. This enables the boom coupler 51 (that is, a fulcrum about which the boom 21 rotates) to be positioned nearer the rear side. As a result, even if the boom 21 has a large length in order to increase the lifting height of the front loader 16, a deviation of the center of gravity is difficult to occur. Consequently, the vehicle body of the tractor 10 can maintain a good balance. Moreover, since the boom 21 can be positioned nearer the rear side, the front-to-rear length of the tractor 10 is not very large even in a state where the front loader 16 is mounted, and therefore the tractor 10 can be stored in a small space.

Near the imaginary straight line 91, the reinforcing rib 44 is connected to the mounting plate 42 and the lower boom-coupling member 45. This enables the own weight of the boom 21 and the like, which are exerted via the boom coupler 51, to be directly received by the reinforcing rib 44 positioned substantially immediately below. As a result, an excessive moment can be prevented from acting on the protruding tube 43 (which is not positioned immediately below the boom coupler 51), and therefore the load of the front loader 16 can be firmly supported.

As described above, the tractor 10 of the present embodiment includes the mounting plates 42, the protruding tubes 43, the boom supporters 47, and the booms 21. The mounting plate 42 is attached to the frame 41 on a side surface of the tractor 10. The protruding tube 43 is connected to the mounting plate 42, and has a shape protruding from a portion in which the protruding tube 43 is connected to the mounting plate 42, toward the outside of the tractor 10. The boom supporter 47 is connected to the distal end portion of the protruding tube 43, and has a shape protruding upward from a portion in which the boom supporter 47 is connected to the distal end portion of the protruding tube 43. The boom 21 is coupled to the boom supporter 47 via the boom coupler 51, and extends frontward from the boom coupler 51. In a side view, the imaginary straight line 91 extending vertically downward from the boom coupler 51 is located rearward of the protruding tube 43.

Consequently, the proximal end portion of the boom 21 can be positioned rearward, and therefore a good load balance can be maintained even if the boom 21 has a large length. Moreover, since the length over which the boom 21 protrudes frontward can be shortened, the tractor 10 capable of being stored in a small space can be provided.

Furthermore, in the tractor 10 of the present embodiment, the boom supporter 47 is formed with the lower boom-coupling member 45, which is positioned at a lower side, and the upper boom-coupling member 46, which is positioned at an upper side. In a side view, the lower boom-coupling member 45 protrudes upward and rearward from the portion in which the lower boom-coupling member 45 is connected to the protruding tube 43. In a side view, the upper boom-coupling member 46 protrudes upward from a portion in which the upper boom-coupling member 46 is connected to the lower boom-coupling member 45.

Thus, by a simple configuration, an upper portion of the boom supporter 47 can be positioned rearward of the protruding tube 43. Therefore, since the proximal end portion of the boom 21 is supported on the upper portion of the boom supporter 47, the boom 21 can easily be disposed nearer the rear side.

In the tractor 10 of the present embodiment, the reinforcing rib 44, which is connected to the mounting plate 42 and the lower boom-coupling member 45 to thereby provide reinforcement, is provided on rearward of the protruding tube 43.

As a result, the lower boom-coupling member 45 is supported by, in addition to the protruding tube 43, the reinforcing rib 44 positioned rearward of the protruding tube 43. Therefore, the boom 21 can be supported with an increased stability.

In the tractor 10 of the present embodiment, the reinforcing rib 44 is connected to the lower boom-coupling member 45, near the portion in which the lower boom-coupling member 45 and the upper boom-coupling member 46 are connected to each other (near the fixture 53).

Accordingly, the portion in which the lower boom-coupling member 45 and the upper boom-coupling member 46 are connected to each other can be reinforced by the reinforcing rib 44. In addition, although most of the load of the boom 21 acts on the boom coupler 51, the boom 21 can be firmly supported as a whole, because the portion in which the lower boom-coupling member 45 and the reinforcing rib 44 are connected to each other exists below the boom coupler 51.

The tractor 10 of the present embodiment includes the floor 13 on which the operator can put his/her feet. Moreover, in the tractor 10, the floor extension member 50 connected to a front portion of the floor 13 (floor flat portion 13a) is provided in an interior space that is formed above the reinforcing rib 44 and inside the boom supporter 47.

This enables effective utilization of the space between the tractor 10 and the boom supporter 47. In addition, since the reinforcing rib 44 is disposed below the floor extension member 50, even if the operator stretches his/her leg to near the floor extension member 50, the reinforcing rib 44 does not become an obstacle.

The tractor 10 of the present embodiment includes the hydraulic pipes 48 that supply hydraulic oil to the hydraulic units (the lift cylinders 23 and the dump cylinders 24). The hydraulic pipes 48 are disposed so as to pass through the interior space.

As a consequence, the hydraulic pipes 48 are positioned above the reinforcing rib 44, and therefore the reinforcing rib 44 can prevent the hydraulic pipes 48 from hanging down. Thus, a special configuration for supporting the hydraulic pipes 48 is not required, and a simple configuration can be realized.

In the tractor 10 of the present embodiment, the hydraulic pipes 48 are disposed below the floor extension member 50.

Therefore, the hydraulic pipes 48 can be disposed in a reasonable manner, by effective utilization of the interior space formed inside the boom supporter 47.

The tractor 10 of the present embodiment includes the hydraulic coupling 49 provided below the floor 13. The hydraulic pipes 48 pass below the floor extension member 50 and above the reinforcing rib 44, and are connected to the hydraulic coupling 49.

Therefore, the hydraulic pipes 48 and the hydraulic coupling 49 can be disposed in a reasonable manner, by effective utilization of the interior space inside the boom supporter 47 and a rearward space thereof (a space below the floor 13).

Figure 6:
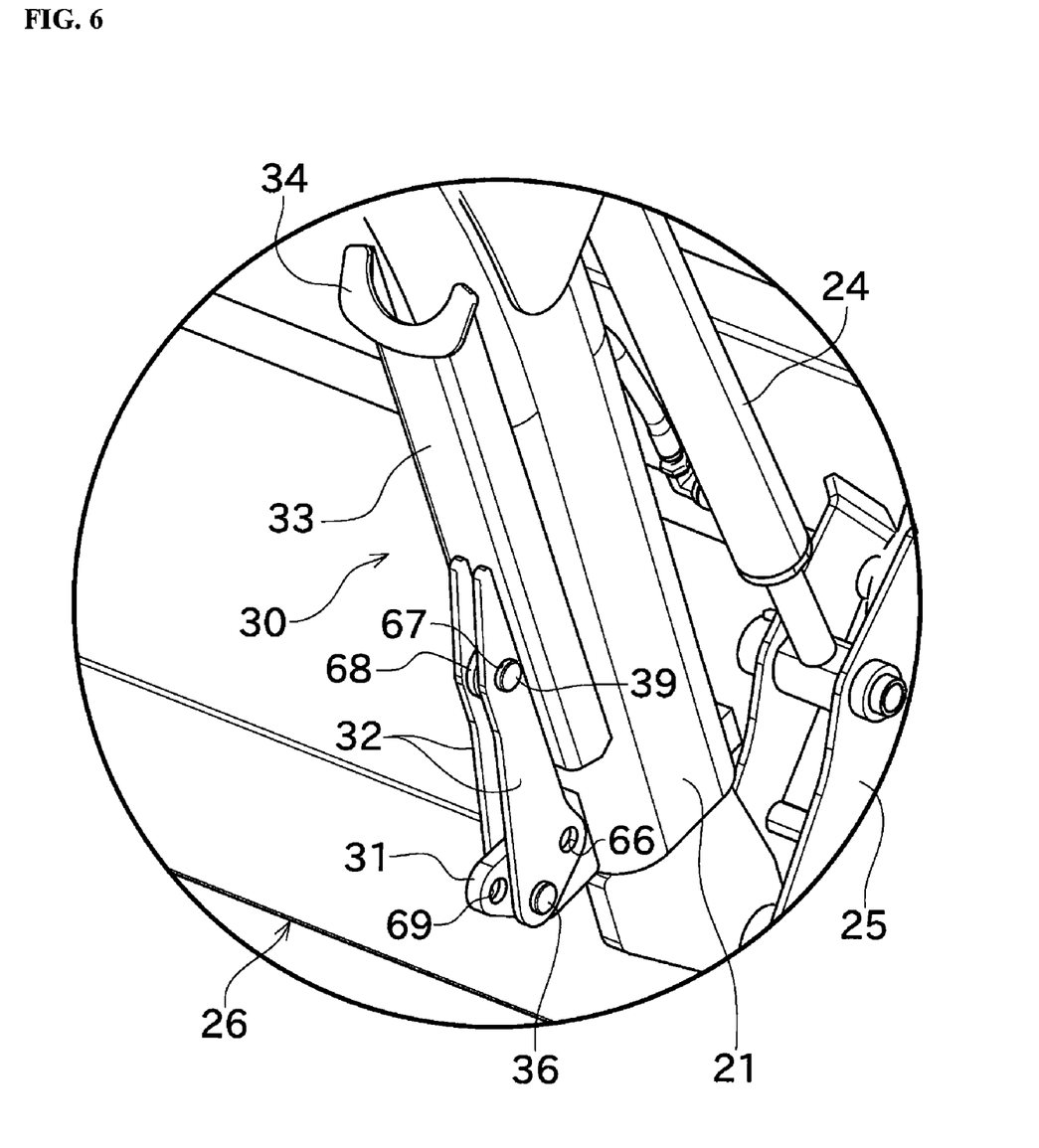
FIG. 6 is a perspective view showing a configuration of a stand in a stored state.
Figure 7:
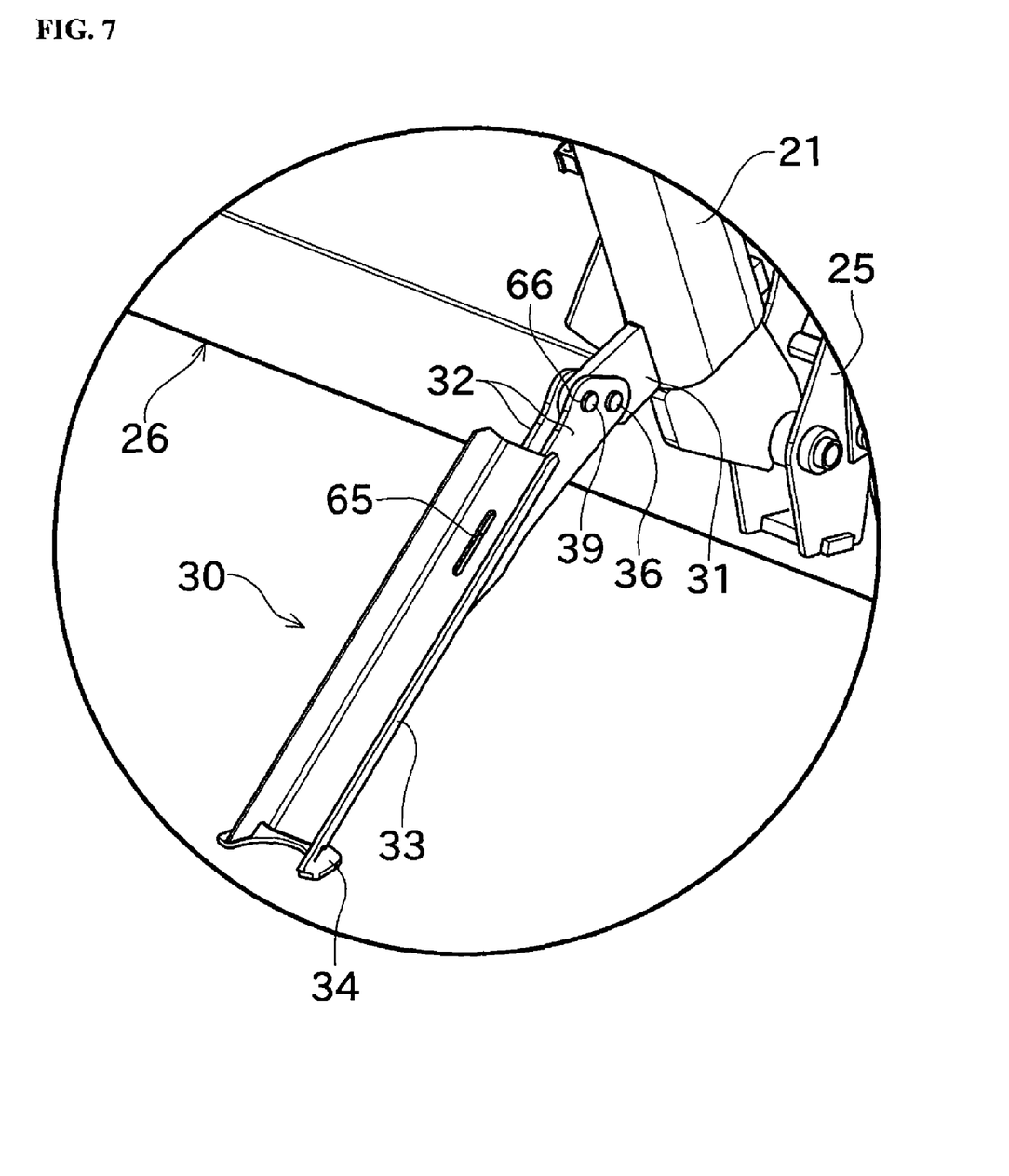
FIG. 7 is a perspective view showing a configuration of the stand in a used state.

Next, a stand 30 will be described with reference to FIGS. 6 and 7. FIG. 6 is a perspective view showing a configuration of the stand 30 in a stored state. FIG. 7 is a perspective view showing a configuration of the stand 30 in a used state.

The stand 30 is for supporting the front loader 16 to prevent falling down thereof, even when the front loader 16 is removed from the tractor 10. As shown in FIG. 1, the stand 30 is installed on the lower surface of an approximately distal end portion of the boom 21. The stand 30 is installed on each of the left and right booms 21. However, the two stands 30 have the same shape, and therefore only the right stand 30 will be described in the following.

The stand 30 is formed with a fulcrum bracket 31, a stand coupling plate 32, a stand column 33, and a ground plate 34.

The fulcrum bracket 31 has a plate-like shape, and is fixed to the distal end portion of the boom 21 by welding or the like. The stand coupling plate 32 is rotatably coupled to the fulcrum bracket 31 via a fulcrum pin 36. A through hole 69 is formed in the fulcrum bracket 31 as shown in FIG. 6, and a fixing pin 39 is insertable into the through hole 69.

The stand coupling plate 32 includes two elongated plate-like members which are formed so as to sandwich the fulcrum bracket 31 therebetween. An end portion, at one side, of the stand coupling plate 32 is coupled to the fulcrum bracket 31 by the fulcrum pin 36. An end portion, at the other side, of the stand coupling plate 32 is fixed to the stand column 33. Also, a stand storing hole 67 for fixing the stand 30 in a stored position is formed in the stand coupling plate 32.

A storing bracket 68 is fixed to the boom 21, at a position above the fulcrum bracket 31 (nearer the proximal end side of the boom 21). A through hole which is not shown and into which the fixing pin 39 is inserted is formed in the storing bracket 68. By fixing this through hole and the stand storing hole 67 by the fixing pin 39 as shown in FIG. 6, the stand 30 can be stored in a state of being flipped up and lying along the boom 21 (stored position). On the other hand, in addition to the stand storing hole 67, a stand use hole 66 for fixing the stand 30 in a used position is formed in the stand coupling plate 32 and near the fulcrum pin 36. By fixing the stand use hole 66 of the stand coupling plate 32 and the through hole 69 by means of the fixing pin 39 as shown in FIG. 7, the stand 30 can be fixed in a state of extending downward and rearward from the boom 21 (used position).

The stand column 33 is formed such that a cross section thereof is curved in a substantially arc-like shape. One end of the stand column 33 is fixed to the stand coupling plate 32. On the other hand, the ground plate 34 is fixed to the other end of the stand column 33. An elongated through groove 65, through which the storing bracket 68 can pass, is formed in the stand column 33.

The ground plate 34 has a ground plane that comes into contact with the ground when the stand 30 is in the used position. Similarly with the stand column 33, the ground plate 34 has a curved, arc-like shape. Therefore, in the stored position, the stand 30 can be compactly stored, because the stand column 33 and the ground plate 34 can, in a good manner, lie along the back surface (lower surface) of the boom 21 having an oval or elliptical cross section (see FIG. 6). As a result, in a state where the boom 21 is lowered, the stand 30 is difficult to interfere with the front wheel 14, and therefore a large range can be ensured as the range in which the boom 21 is movable.

Figure 8:
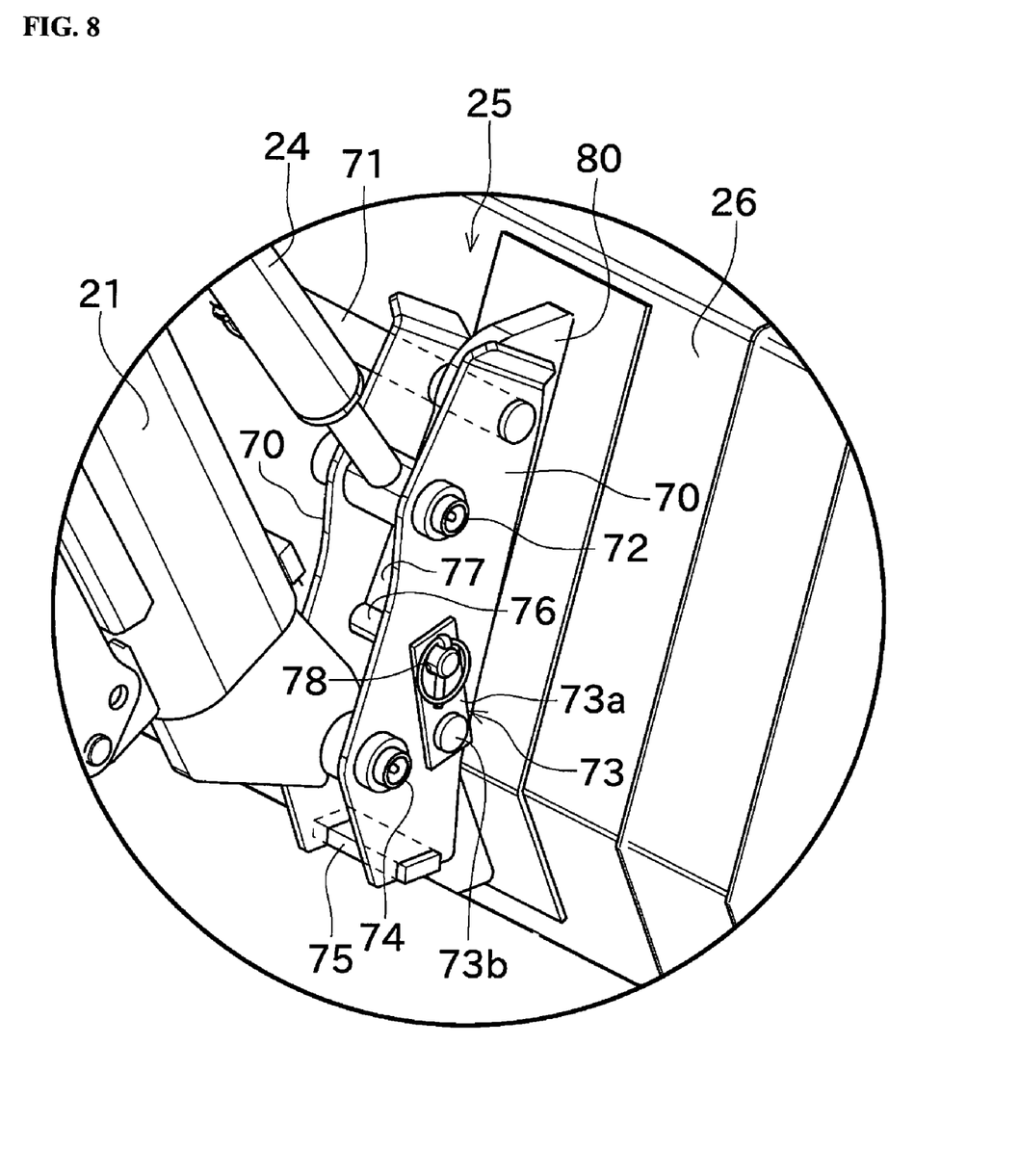
FIG. 8 is a perspective view showing a configuration of a hitch.
Figure 9:
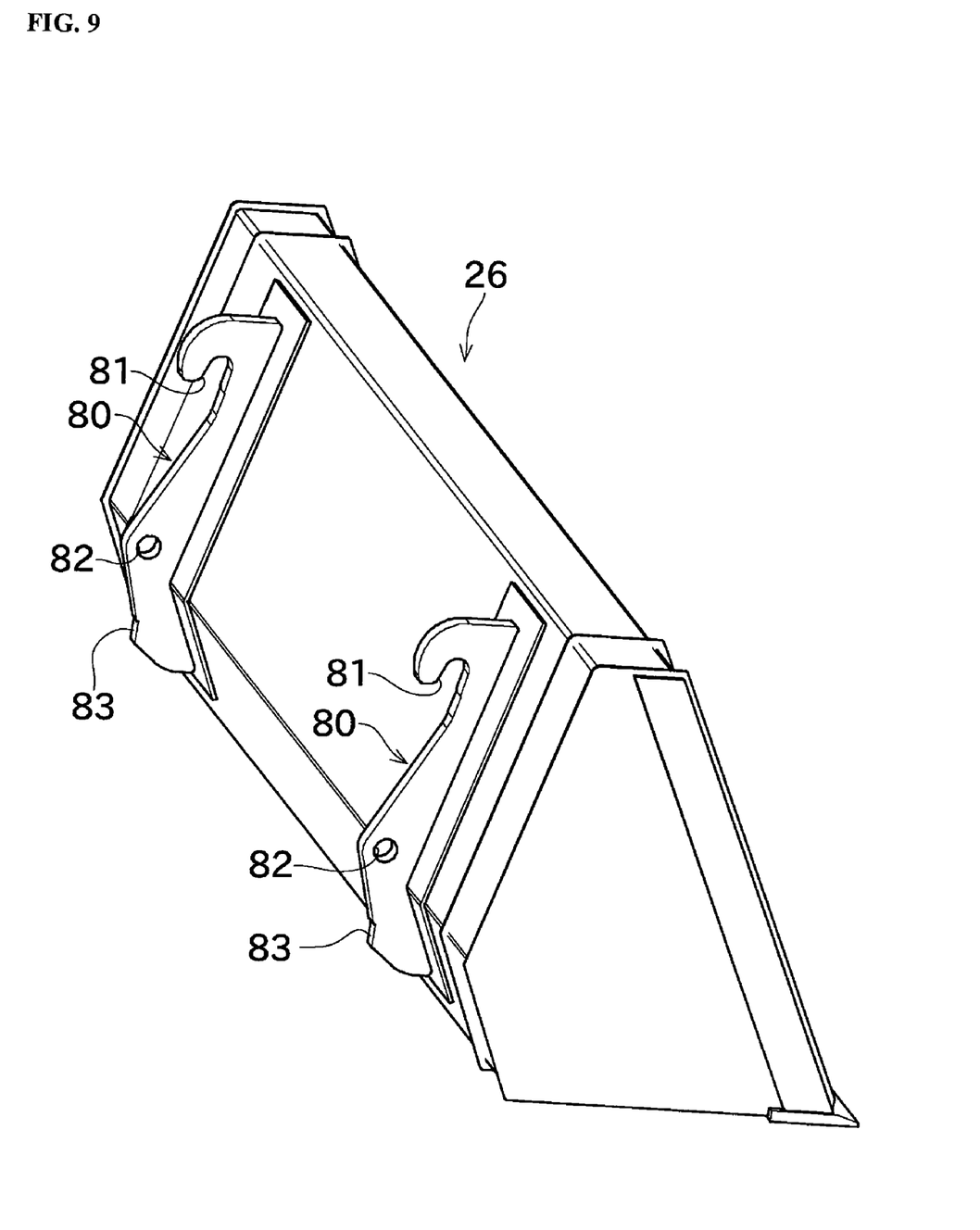
FIG. 9 is a perspective view showing a configuration of the back side of a bucket.
Figure 10:
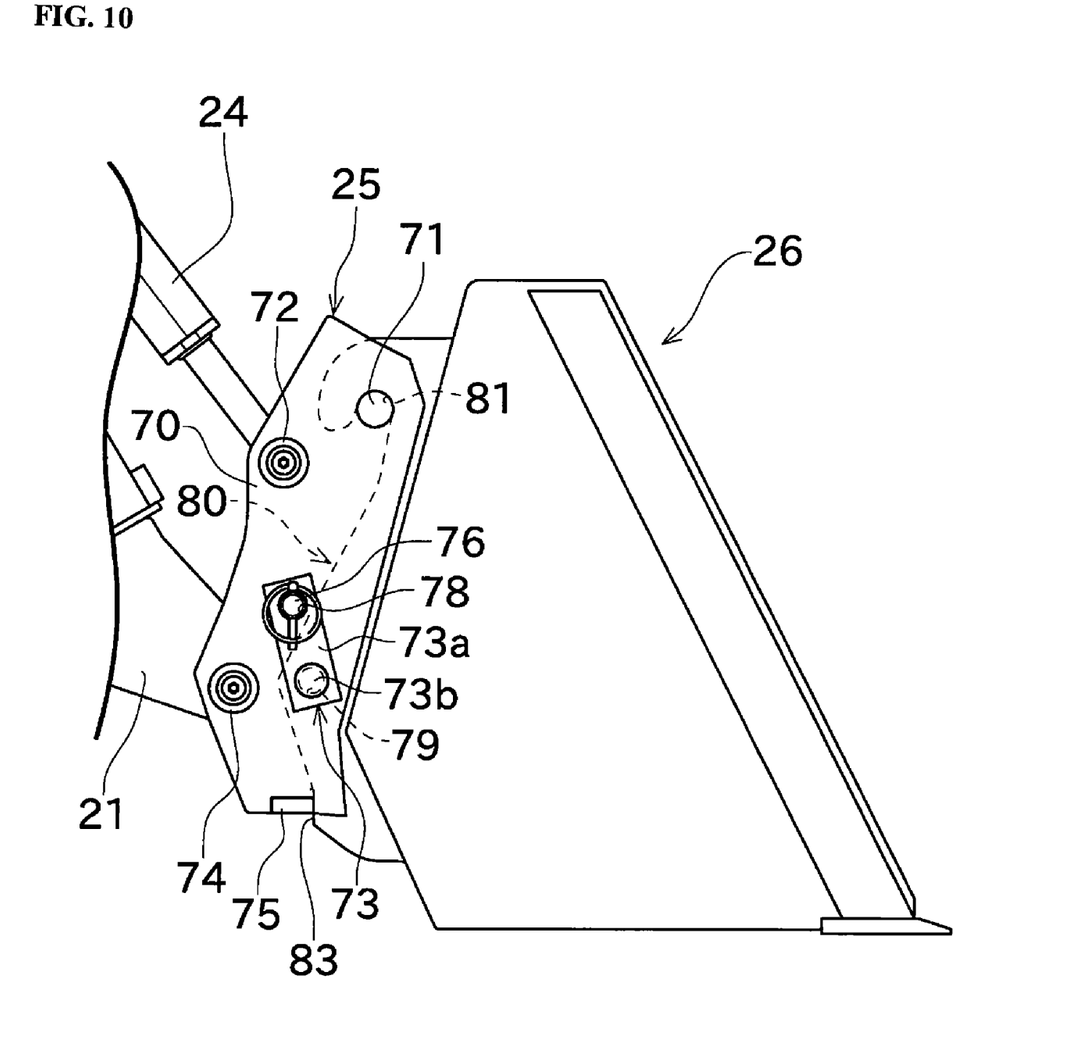
FIG. 10 is a side view illustrating that, when the bucket is mounted, a coupling plate sets a position.
Figure 11:
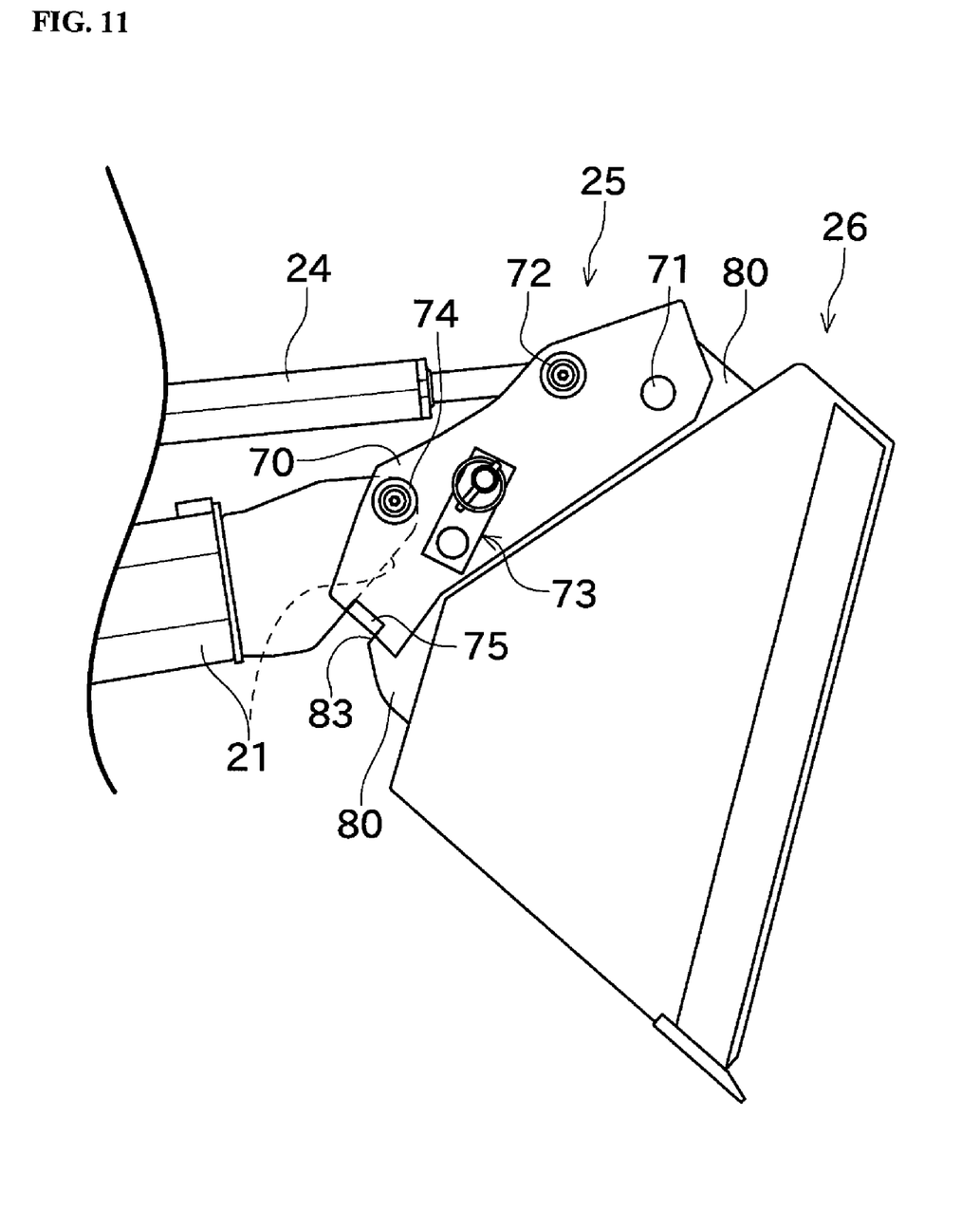
FIG. 11 is a side view illustrating that, when the bucket is rotated downward, the coupling plate restricts excessive rotation.

Next, a structure for mounting the bucket 26 to the hitch 25 in a detachable manner will be described with reference to FIGS. 8 to 11. FIG. 8 is a perspective view showing a configuration of the hitch 25. FIG. 9 is a perspective view showing a configuration of the back side of the bucket 26. FIG. 10 is a side view illustrating that, when the bucket 26 is mounted, a bottom plate 75 sets a position. FIG. 11 is a side view illustrating that, when the bucket 26 is rotated downward, the bottom plate 75 restricts excessive rotation.

Firstly, the configuration of the hitch 25 side will be described with reference to FIG. 8. Although a pair of hitches 25 are provided so as to correspond to the left and right booms 21, respectively, the configurations of these two hitches 25 are symmetrical to each other, and therefore only one of the hitches 25 will be described as a representative. As shown in FIG. 8, the hitch 25 includes two hitch plates 70. The two left and right hitch plates 70 are symmetrical to each other, and disposed in parallel at a predetermined interval.

The two hitch plates 70 are coupled to each other by a first coupling rod 71, a second coupling rod 76, an intermediate plate 77, and a bottom plate 75.

The first coupling rod 71 is formed in the shape of a round rod, and couples upper portions of the respective hitch plates 70 to each other. The first coupling rod 71 is elongated horizontally toward the opposite hitch 25. The first coupling rod 71 couples two hitch plates 70 at one end thereof, and couples two hitch plates 70 at the other end thereof.

The second coupling rod 76 is also formed in the shape of a round rod, and couples approximately central portions of the respective hitch plates 70 to each other. One end of the second coupling rod 76 protrudes through one of the hitch plates 70, and a fixture 73 which will be described later can be attached to this protruding portion.

The intermediate plate 77 is formed so as to couple the upper portions of the two respective hitch plates 70 to each other, and also couple the first coupling rod 71 and the second coupling rod 76 to each other. Thus, the rigidity of the hitch 25 is effectively improved.

The bottom plate 75 is formed so as to couple bottom portions of the two respective hitch plates 70 to each other.

To the upper portions of the two hitch plates 70, a distal end portion of the dump cylinder 24 is rotatably attached by a coupler 72. Also, to the lower portions of the two hitch plates 70, the distal end of the boom 21 is rotatably attached by a coupler 74.

Next, the configuration of the back surface side of the bucket 26 will be described. As shown in FIG. 9, at the back surface side of the bucket 26, hook plates 80 for attaching the hitches 25 to the bucket 26 are arranged at two positions corresponding to the left and right booms 21, respectively.

A cutout portion 81 shaped so as to be open at its lower side is formed in an upper portion of the hook plate 80, and thereby a hook is formed. The hook can be hitched to the first coupling rod 71 provided in the hitch 25. A mounting hole 82 for connecting the hook plate 80 to the hitch 25 is formed in the hook plate 80. Moreover, a positioning plane 83 which can be brought into contact with the bottom plate 75 is formed in a lower portion of the hook plate 80.

For mounting the bucket 26 to the hitch 25, the hook plate 80 is put into between the two hitch plates 70 so as to insert the hook plate 80 from above. As shown in FIG. 8, upper end portions of the hitch plates 70 are formed in such a manner that an interval therebetween increases toward the upper ends of the hitch plates 70 and thus forms a tapered shape. Due to this taper, even if the position of the hook plate 80 is slightly misaligned, the hook plate 80 can be guided so as to smoothly enter between the two hitch plates 70.

In the above configuration, in a state (FIG. 10) where the cutout portion 81 (hook) of the hook plate 80 is hitched to the first coupling rod 71 of the hitch 25 and in addition the positioning plane 83 is in contact with the bottom plate 75 of the hitch 25, the fixture 73 is attached to an insertion hole 79 formed in the hitch plate 70, to thereby couple the bucket 26 and the hitch 25 to each other.

A configuration of the fixture 73 will be specifically described. As shown in FIG. 10, the fixture 73 includes a mounting plate 73a having a rectangular shape, and a coupling rod 73b fixed to the mounting plate 73a. A through hole 78, through which the protruding portion of the second coupling rod 76 is insertable, is formed in the mounting plate 73a. The coupling rod 73b is inserted into the insertion hole 79 of the hitch plate 70 and the mounting hole 82 of the hook plate 80, and in addition the protruding portion of the second coupling rod 76 is passed through the through hole 78 of the mounting plate 73a. In this state, a retaining pin is fitted to a distal end portion of the second coupling rod 76, and fixed such that the mounting plate 73a is not detached. In the above manner, the bucket 26 can be mounted to the boom 21.

For removing the bucket 26 from the hitch 25 to replace the bucket 26 with another implement for example, the above-described operation may be performed in the reverse sequence. That is, the bucket 26 can be easily removed from the hitch 25 by removing the fixture 73 and disengaging the cutout portion 81 (hook) from the first coupling rod 71.

The bottom plate 75 has the function of setting a position when the bucket 26 is mounted to the hitch 25 as described above, but the bottom plate 75 also functions as a rotation restriction member that restricts a rotation stroke of the bucket 26. Specifically, although extending the dump cylinder 24 causes the dumping operation in which the bucket 26 is rotated downward; when the bucket 26 is rotated through a predetermined angle, the bottom plate 75 comes into contact with the distal end of the boom 21 as shown in FIG. 11, so that further rotation can be prevented.

In this manner, the bottom plate 75 of the present embodiment has the function of reinforcing the connection between the hitch plates 70, the function of setting a position when the bucket 26 is mounted, and the function of preventing excessive rotation of the bucket 26. Therefore, by using the above-described configuration, the number of parts can be reduced, and the front loader 16 having a simple configuration can be provided.

A preferred embodiment of the present invention has been described above, but the above-described configuration may further be modified as follows.

Although, in the present embodiment, the tractor 10 is used as a work vehicle, the above-described configuration may be applied to another vehicle as long as the vehicle is a work vehicle to and from which the front loader 16 is attachable and detachable.

The bucket 26 of the above-described embodiment has its upper portion coupled to the hitch 25 by using the cutout portion 81 of the hook plate 80. However, instead of this configuration, the bucket may be configured so as to be coupled to a hitch by a coupling rod being passed through a mounting hole.

An application of a coupling part using the hook plate 80 of the above-described embodiment is not limited to the bucket 26, but may be a configuration for detachably mounting another attachment, such as a fork, to the hitch 25.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:
1. A work vehicle comprising:
a mounting plate attachable to a frame that is on a side surface of a vehicle body;
a protruding member that is connected to the mounting plate and shaped so as to protrude from a portion in which the protruding member is connected to the mounting plate, toward the outside of the vehicle body;
a boom supporter that is connected to a distal end portion of the protruding member and shaped so as to protrude upward from a portion in which the boom supporter is connected to the distal end portion of the protruding member; and a boom that is coupled to the boom supporter via a coupling part and formed so as to extend from the coupling part toward the front side of the vehicle body, wherein:

in a side view, an imaginary straight line extending vertically downward from the coupling part is located rearward of the protruding member, the boom supporter includes a lower boom-coupling member positioned at a lower side and an upper boom-coupling member positioned at an upper side, in a side view, the lower boom-coupling member protrudes upward and rearward from the portion in which the lower boom-coupling member is connected to the protruding member, in a side view, the upper boom-coupling member protrudes upward from a portion in which the upper boom-coupling member is connected to the lower boom-coupling member, and a reinforcing member, which is connected to the mounting plate and the lower boom-coupling member to thereby provide reinforcement, is provided rearward of the protruding member.

2. The work vehicle according to claim 1, wherein the reinforcing member is connected to the lower boom-coupling member, near the portion in which the lower boom-coupling member and the upper boom-coupling member are connected to each other.

3. The work vehicle according to claim 2, comprising:
a floor on which an operator can put his/her feet; and
a floor extension member that is connected to a front portion of the floor and provided in an interior space formed above the reinforcing member and inside the boom supporter.

4. The work vehicle according to claim 3, comprising a hydraulic pipe that supplies hydraulic oil to a hydraulic unit, wherein
the hydraulic pipe passes through the interior space.

5. The work vehicle according to claim 4, wherein
the hydraulic pipe is disposed below the floor extension member.

6. The work vehicle according to claim 4, comprising a hydraulic coupling disposed below the floor, wherein
the hydraulic pipe passes below the floor extension member and above the reinforcing member, and is connected to the hydraulic coupling.

* * * * *